United States Patent [19]

Gotoh et al.

[11] Patent Number: 5,025,546
[45] Date of Patent: Jun. 25, 1991

[54] METHOD OF JOINING PIPES

[75] Inventors: Taiji Gotoh; Hidetoshi Yamamoto; Kiyoshi Yamada, all of Kuwana, Japan

[73] Assignee: Mie Hooro Co., Ltd., Mie, Japan

[21] Appl. No.: 462,997

[22] Filed: Jan. 8, 1990

Related U.S. Application Data

[63] Continuation of Ser. No. 195,118, May 17, 1988, abandoned.

[30] Foreign Application Priority Data

May 23, 1987 [JP] Japan .................................. 62-126703
Jan. 26, 1988 [JP] Japan .................................. 63-15681

[51] Int. Cl.$^5$ ............................................. B21D 39/00
[52] U.S. Cl. ............................................ 29/508; 29/517
[58] Field of Search .................... 29/235, 237, 243.5, 29/508, 510, 511, 515, 516, 517, 432; 72/416; 285/382, 382.1, 382.2, 382.7

[56] References Cited

U.S. PATENT DOCUMENTS 3,632,141  1/1972  Larsson .................. 285/382.7 X
4,483,056  11/1984  Schwalm et al. .................. 29/237

FOREIGN PATENT DOCUMENTS 2725280  12/1978  Fed. Rep. of Germany ... 285/382.2
57-130729  8/1982  Japan .
57-142729  9/1982  Japan .................................. 29/237
61-75582   5/1986  Japan .
891632     3/1962  United Kingdom .
2107812    5/1983  United Kingdom .

Primary Examiner—Timothy V. Eley
Attorney, Agent, or Firm—Frishauf, Holtz, Goodman & Woodward

[57] ABSTRACT

Disclosed is a method of joining piping materials which comprises, forming at an end portion of one piping material to be joined a socket composed of a tapered portion which is diametrally enlarged gradually toward the pipe end and a maximum diameter portion extending from the tapered portion with the maximum diameter thereof, then fitting an intermediary inserting member along the internal peripheral surface of the tapered portion in the socket to be in intimate contact therewith and thereafter inserting an end portion of the other piping material thereto, further pressurizing the external peripheral of the socket with two clamping members having a lateral cross-sectional shape with the center position as the deepest portion and tapered planes of clamping action on both sides thereof in the radial direction, thereby effecting plastic deformation of the maximum diameter portion in the diameter shrinking direction. Also disclosed is a joining tool, provided with: two clamping members each having a lateral cross-sectional shape with its center position as the deepest portion, and each having tapered planes of clamping action on both sides thereof at the tip end side and an actuating lever at the base end; a connecting plate supporting the both clamping members with the tapered planes of clamping action opposed to each other freely expandably and shrinkably with rotational axes; and a pushing rod to be pressurized into between the actuating levers of the both clamping members.

12 Claims, 8 Drawing Sheets

METHOD OF JOINING PIPES

This application is a continuation, of application Ser. No. 07/195,118, filed May 17, 1988, now abandoned.

BACKGROUND OF THE INVENTION

This invention relates to a method of joining piping materials, which is suitable for joining two thin-walled stainless steel pipes and for joining a metallic pipe and a metallic pipe coupling.

It is well known to join piping materials such as metallic pipes, pipe couplings, etc. with a technique to thread end portions of the piping materials and screw one piping material into the other. However, such method has not been satisfactory with respect to workability, pressure resistance, airtightness, etc. The present applicant has previously invented a joining method to form a diametrically enlarged portion at an end portion of one piping material, i.e. a tapered portion, to which an annular gasket having a wedge-shaped cross-section is interposed and further an end portion of the other piping material is inserted, followed by application of pressure from the periphery to achieve plastic deformation of the diametrally enlarged portion. This is disclosed in Japanese Provisional Patent Publication No. 130729/1982. Also, according to subsequent studies by the present applicant, it has been found that more effective joining can be done by inserting a C ring as shown in Japanese Unexamined Utility Model Publication No. 75582/1986 together with the annular gasket into the diametrally enlarged portion.

In the method as mentioned above, for plastic deformation of the diametrally enlarged portion, joining the piping materials to each other was effected by approaching in the axis direction a first jaw having a lateral cross-sectional shape with the tapered planes of clamping action and a second jaw having a tapered planes of clamping action in the opposite direction thereto. Therefore, the jaws of the joining tool are required to move complicatedly, thus causing the size of the joining tool to be too large. This is particularly problematic because it is impossible to effect joining of piping materials near walls.

SUMMARY OF THE INVENTION

An object of the present invention is to solve the problems as described above and to provide an improved method of joining piping materials.

The method of joining piping materials according to this invention is characterized by, forming at an end portion of one piping material to be joined a socket comprising a tapered portion which is diametrically enlarged gradually toward the pipe end and a maximum diameter portion extending from said tapered portion with the maximum diameter thereof. Then, an intermediary inserting is fitting along the internal peripheral surface of said tapered portion in the socket to be in intimate contact therewith and thereafter inserting an end portion of the other piping material thereto. The external periphery of said socket is compressed with two clamping members having a lateral cross-sectional shape with the center position as the deepest portion and tapered planes of clamping action on both sides thereof in the radial direction, thereby effecting plastic deformation of said maximum diameter portion in the diameter shrinking direction.

DESCRIPTION OF THE PREFERRED EMBODIMENTS

Example 1

Figure 1:
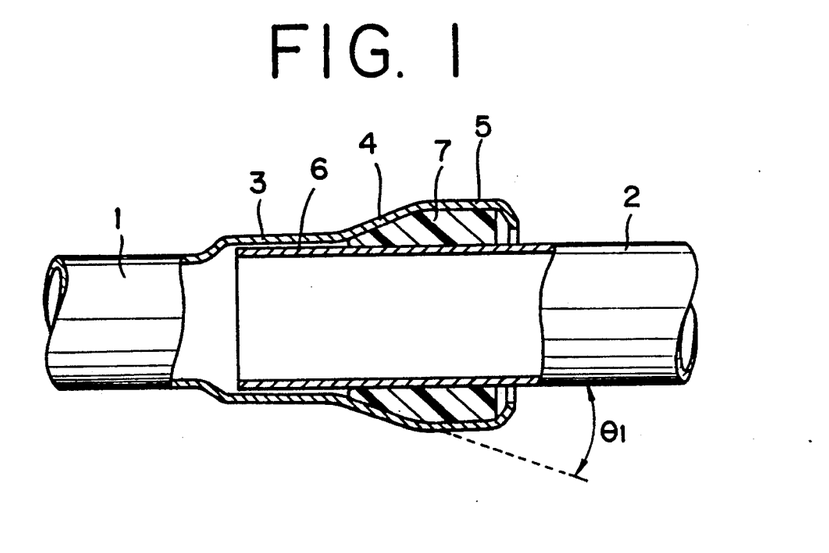
FIGS. 1 to 3 are sectional views of the steps for illustration of an example of the joining method of the present invention, respectively.

First, as shown in FIG. 1, at the end portion of one of the two piping materials 1 and 2 which are to be joined, is a socket composed of a diametrally enlarged portion 3 having a diameter slightly enlarged such that the other piping material 2 may be inserted thereinto, a tapered portion 4 being gradually enlarged diametrically from this diametrically enlarged portion 3 toward the pipe end, and a maximum diameter portion 5 extending from said tapered portion 4 parallel with the pipe axis. This tapered portion 4 is preferably allowed to form an angle $\theta_1$ of about 10° to 30° with the center axis of the piping material 1 in a cross-section cut along the plane including the axis of said piping material 1.

Next, after an annular gasket 7, which comprises synthetic material such as an ethylene propylene rubber (EPDM), having a wedge-shaped cross-section to be disposed in intimate contact with the internal peripheral surfaces of the tapered portion 4 and the large diameter portion 5 are inserted into the socket, and then the end portion 6 of the other piping material 2 is inserted thereinto.

Figure 2:
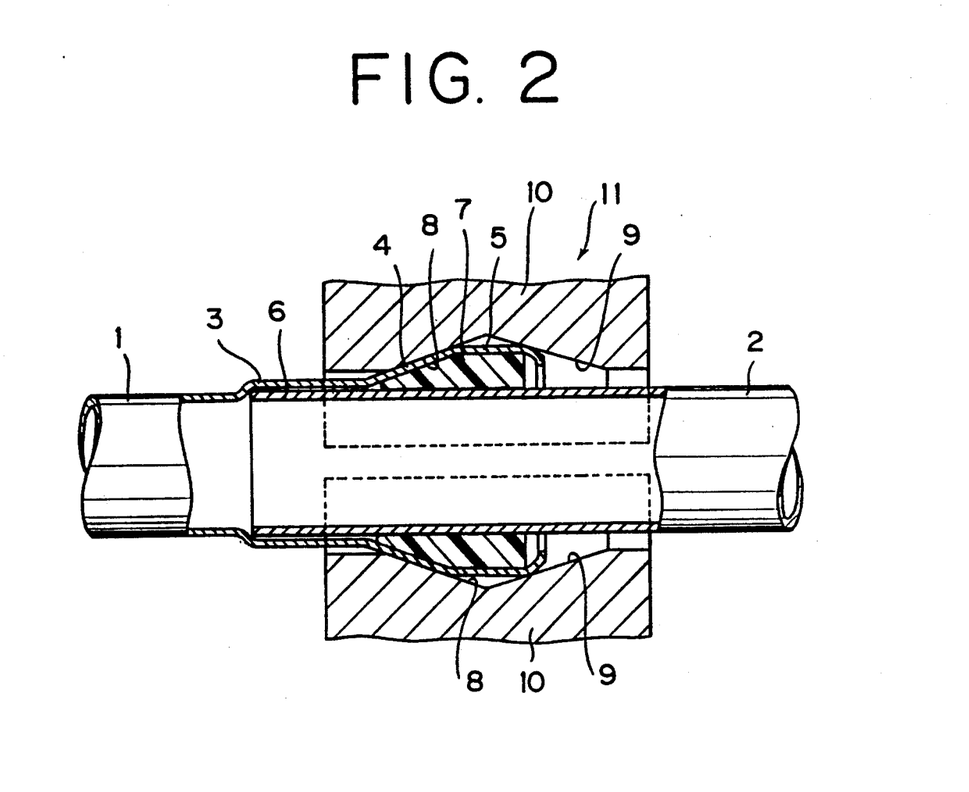

As shown in FIG. 2, the external periphery of the above socket is sandwiched between a joining tool 11 provided with two clamping members 10, 10 each having a wedge-shaped cross-section with the center position as the deepest portion and tapered planes of clamping action 8, 9 formed on both sides thereof.

Figure 4:
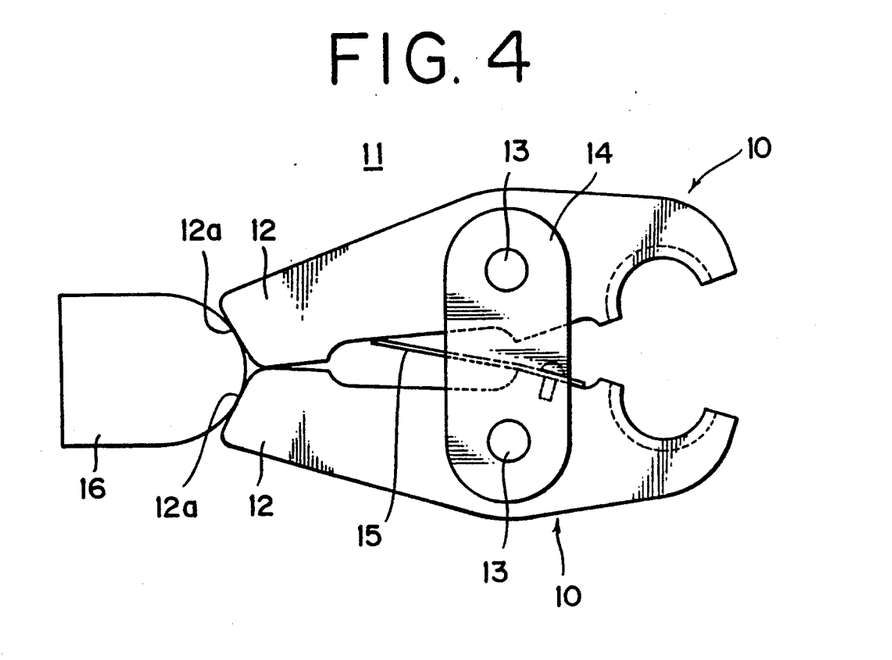
FIGS. 4 to 6 are side views showing an example of the joining tool of the present invention, respectively.
Figure 5:
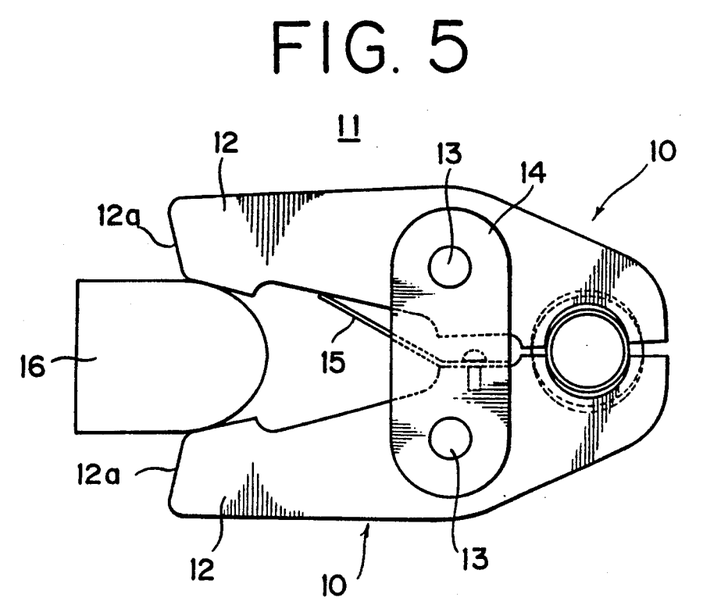
Figure 6:
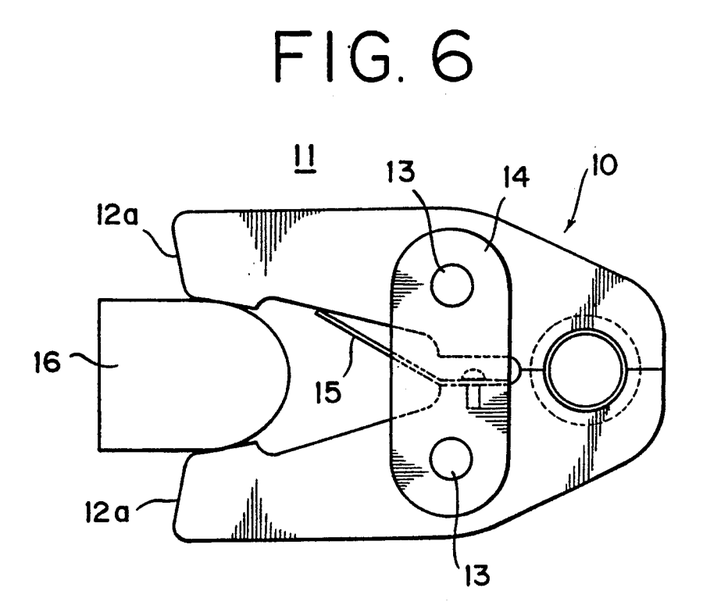

The joining tool 11, as shown in FIGS. 4 to 6, is provided with two clamping members 10, 10 each having the above tapered planes of clamping action 8, 9 at the tip end side and an actuating lever 12 at the base end, a pair of front and back connecting plates 14, 14 supporting mutually these clamping members 10, 10 with the above tapered planes of clamping action 8, 9 opposed to each other, clamping members 10, 10 are freely rotatable around rotational axes formed by pins 13, 13. A spring member, for example, a plate spring 15, is fixed at a predetermined position on the tapered planes of clamping action side of one clamping member 10, elastically supports the other clamping member 10 and urges the tip ends of the both clamping members toward the closing direction.

Clamping members 10, 10 are made to have their tip ends separate by pressing actuating levers 12, 12 of both clamping members 10, 10 toward each other with the hands by a user when the joining tool is used. When the pushing rod 16 having a curved surface on the tip end is pushed between the actuating levers 12, 12 of both clamping members 10, 10 by hydraulic pressure, etc., as shown in FIG. 5, FIG. 6, the tip end of the pushing rod 16 is guided by the guide faces 12a, 12a which are formed on the base end of each actuating lever 12 and have curved shapes, whereby the base end sides of the both clamping members 10, 10 are pushed to open and the tip ends of the clamping members 10, 10 are closed with a strong force based on the principle of leverage with the pins 13, 13 as the supporting points.

In this case, the spring member may of any type, provided that it can urge the tip ends of both clamping members 10, 10 during non-use toward the closing direction, and other than the above plate spring 15, coil springs provided at the base end sides of both clamping members 10, 10 for urging both members 10, 10 toward the closing direction may be also employed.

Figure 3:
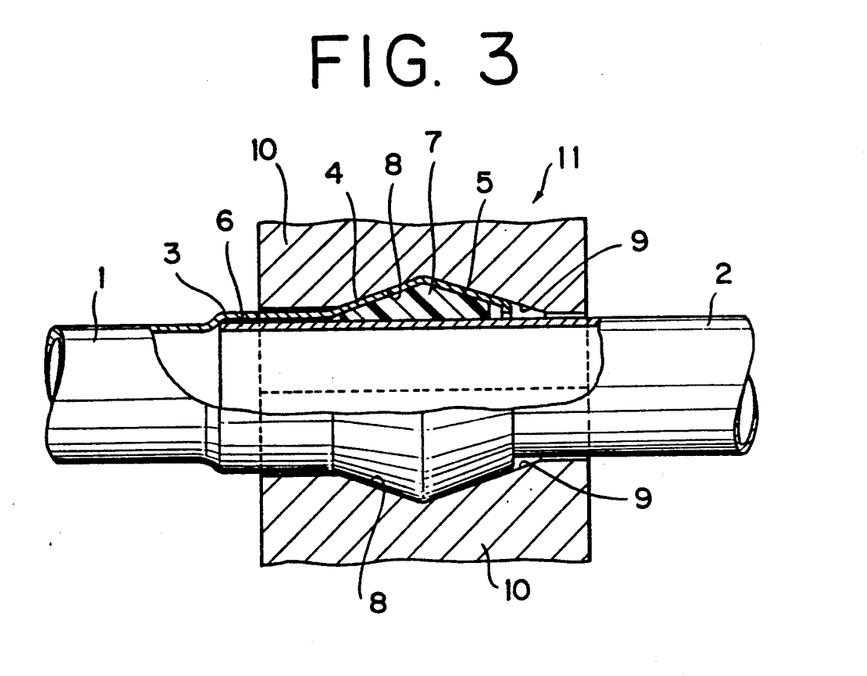

With the clamping members 10, 10 of such joining tool being mounted, as shown in FIG. 2, at the external periphery of the socket so that one of the tapered planes of clamping action 8, 8 may contact the tapered portion 4 of the piping material 1, the pushing rod 16 of the joining tool 11 is pushed to close the clamping members 10, 10. As a result, as shown in FIG. 3 the maximum diameter portion 5 immediately adjacent to the tapered portion 4 is compressed in diameter toward the pipe end by the other tapered planes of clamping action 9, 9 of the clamping members 10, 10 to be plastically deformed in tapered form.

Therefore, the annular gasket 7 is pushed strongly toward the tapered portion 4 side by the plastic deformation of the maximum diameter portion 5. Through the wedge action by the pushing pressure, the annular gasket 7 is compressed between the internal peripheral surface of the socket and the external peripheral surface of the end portion 6 of the other piping material, and is consequently pressed firmly against these surfaces through its restoring force. As a result, good air tightness and pressure resistance are obtained.

Example 2

Figure 7:
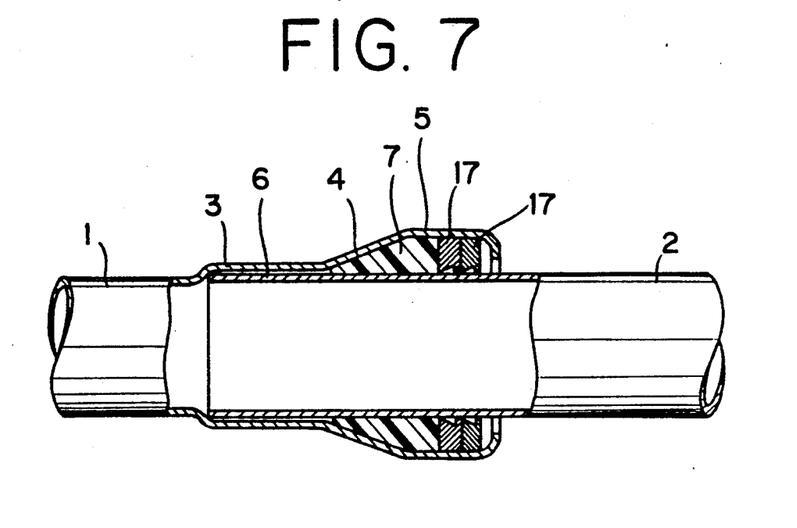
FIGS. 7 to 9 are sectional views of the steps for illustration of another example of the joining method according to the present invention, respectively.

The second example shown in FIG. 7 uses as a intermediary insert, in addition to the above annular gasket 7, two C rings 17 which are in close contact with the internal peripheral surface of the maximum diameter portion 5 and the pipe end side face of the annular gasket 7, and the joining tool used is the same as in Example 1.

Figure 8:
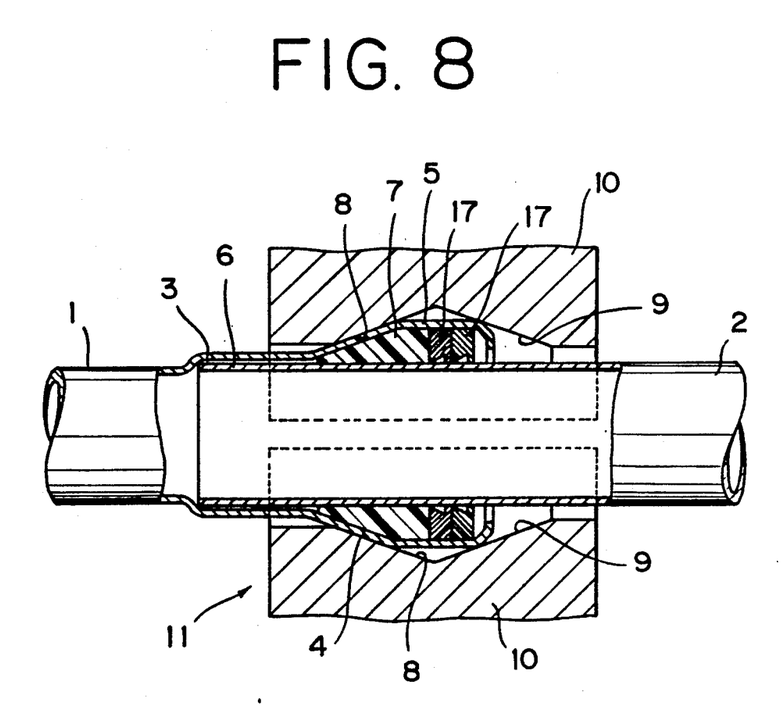
Figure 9:
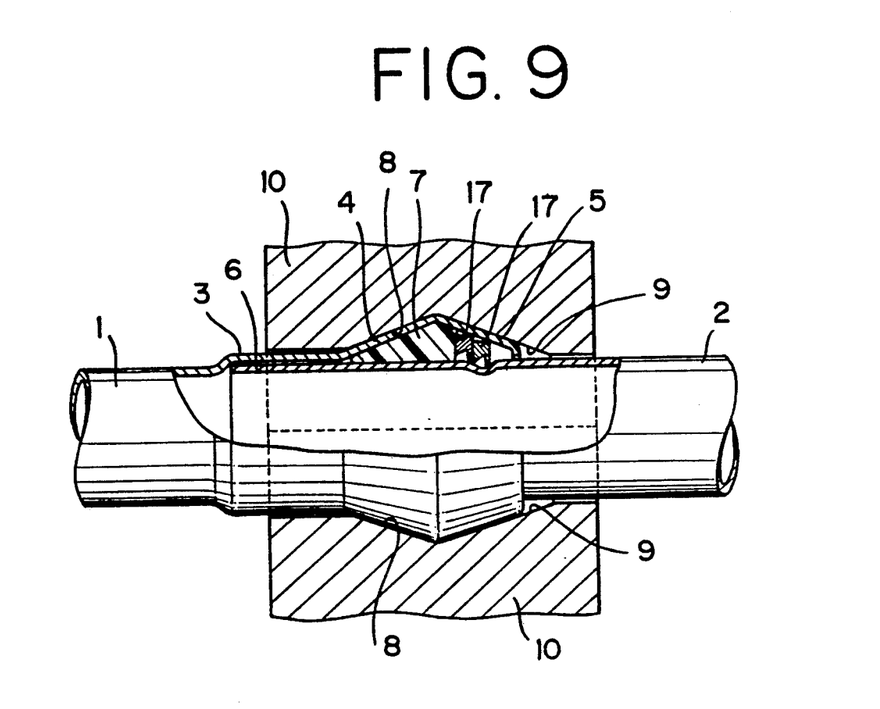

Similarly as in Example 1, the maximum diameter portion 5 continuous to the tapered portion 4 is compressed in diameter as shown in FIGS. 8 and 9 toward the pipe end by the clamping members 10, 10 of the joining tool 11 to effect plastic deformation thereof in tapered form. As a result, the annular gasket 7 is compressed between the internal peripheral surface of the socket and end portion 6 of the other piping material. Simultaneously, the C rings 17, 17 are compressed against the external peripheral surface of the end portion 6 of the other piping material, whereby a better tightness and pressure resistance than in Example 1 can be effected.

Figure 10:
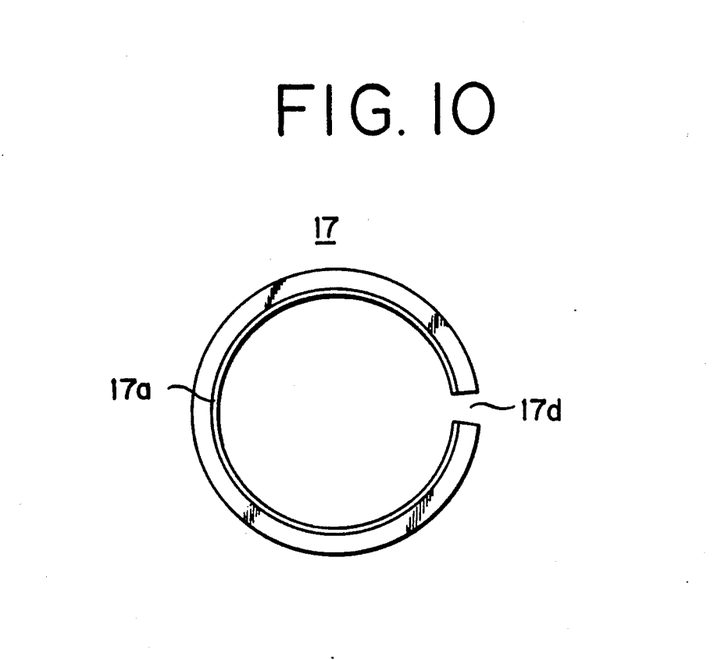
FIG. 10 is a plan view showing a C ring.
Figure 11:
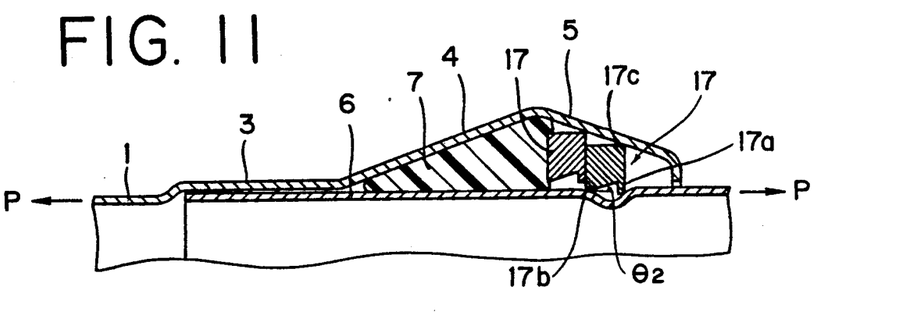
FIG. 11 is a sectional view showing the state in which the C ring is impressed against the external peripheral surface at the end portion of the piping material.

The C ring 17 may be one punched out in planar C-form from a steel plate as shown in FIG. 10, but may preferably have a sharp rim 17a being provided on the pipe end side along the entire internal peripheral surface of said ring 17 which is to be compressed against the external peripheral surface of the end portion 6 of the other piping material. As shown in FIG. 11 which shows its cross-sectional shape, said C ring 17 has a construction such that the cornered edge 17b formed along the internal peripheral surface of the ring 17 on the annular gasket side may have an acute angle, preferably such that the angle $\theta_2$ formed between the internal peripheral surface of the ring 17 forming this cornered edge 17b and the external peripheral surface of the end portion 6 of the piping material 2 may be about 5° to 15°, more preferably 10°, and that the cornered edge 17c formed along the external peripheral surface of the ring 17 on the pipe end side may also have an acute angle.

The reason is because the C ring 17 can be readily compressed against the external peripheral surface of the end portion 6 of the other piping material 2. Thus, 17b, 17c when a strong pull-out force is exerted on the joined two piping materials in the directions as shown by the arrows P, the sharp cornered edges 17c, 17b are compressed, respectively against the internal peripheral surface of the maximum diameter portion and the external peripheral surface of the end portion 6 of the other piping material 2 of the socket, thereby giving rise to a pull-out resistance which resists said pull-out force.

Example 3

Figure 12:
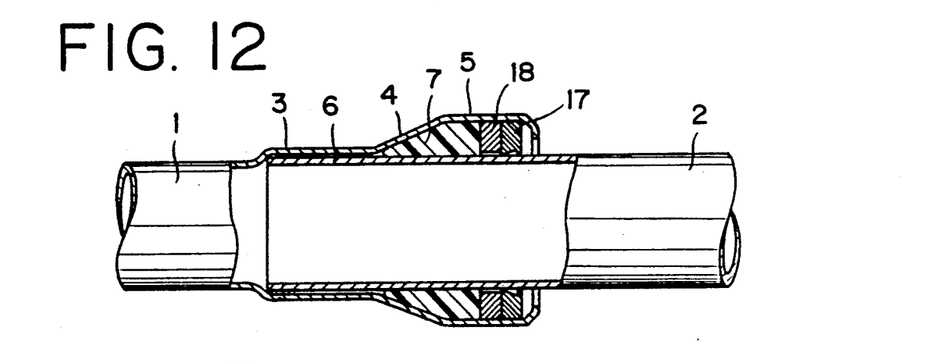
FIG. 12 is a sectional view of the steps for illustration of still another example of the joining method according to the present invention.

As shown in FIG. 12 an annular gasket 7 having a wedge-shaped cross-section is disposed in intimate contact with the internal peripheral surface of the tapered portion 4, a back-up ring 18 is disposed in intimate contact with the internal peripheral surface of the maximum diameter portion 5 and the pipe end side face of the annular gasket 7. A C ring 17 is disposed in intimate contact with the internal peripheral surface of the maximum diameter portion 5 and the pipe end side face of the back-up ring 18. The joining tool used has the same construction as in Examples 1 and 2.

The back-up ring 18 has an external diameter which is closely contacted on the internal peripheral surface of the maximum diameter portion 5, and may be made of any material, provided that it has rigidity capable of preventing insertion of the annular gasket 7 into the gap 17d (see FIG. 10) of the C ring when pressure is applied.

According to this Example, through the intermediary presence of the back-up ring 18, during application of pressure, annular gasket 7 will not be pressed into the gap 17d of the C ring 17. Consequently, improvements in air tightness, pressure resistance relative to the other Examples can be effected.

Example 4

The joining tool shown in this Example is a further improvement of the joining tool shown in the above Examples 1 to 3, but the joining method of piping materials is the same as for the respective Examples described above.

This Example is described in detail below by referring to FIGS. 13 through 17.

Figure 13:
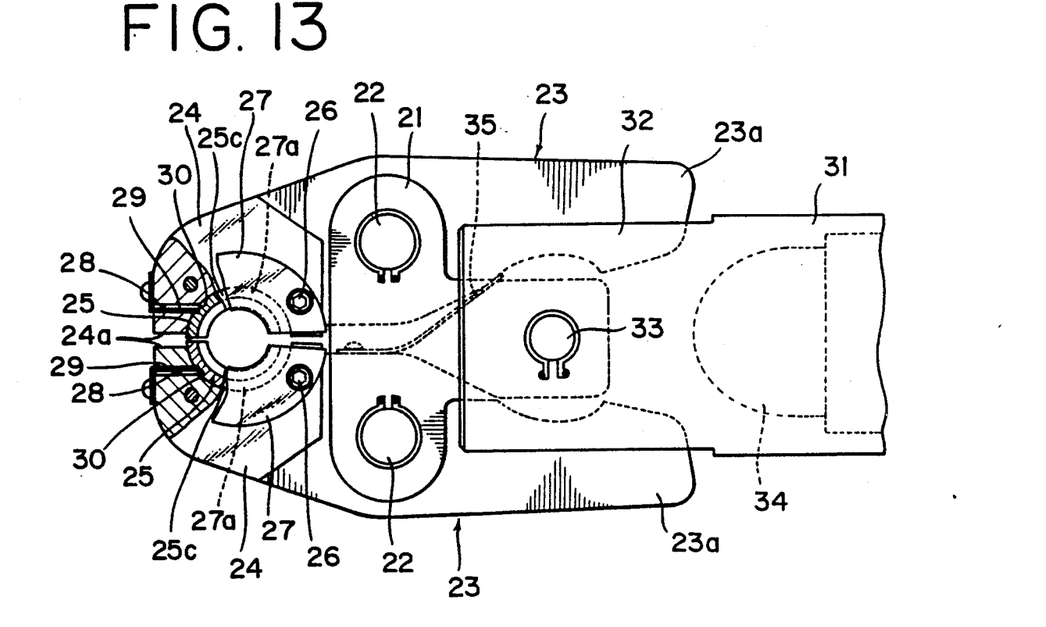
FIG. 13 is a side view partially cut away showing another example of the joining tool of the present invention.

The joining tool 20 has a pair of clamping members 23, 23 mounted freely at both ends of a pair of front and back connecting plates 21, 21 with pins 22, 22 as rotational axes.

In the jaw frame 24 at the tip end side of each clamping member 23, half cylindrical clamping jaw 25 is equipped with tapered planes of clamping action 25a, 25b with the center position as the deepest portion.

Figure 14:
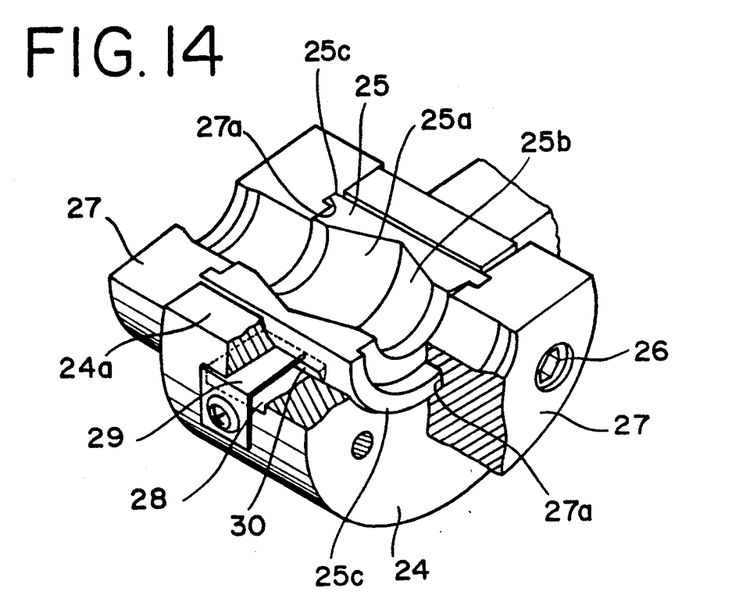
FIG. 14 is a perspective view partially cut away of the pertinent portion of the joining tool shown in FIG. 13.

As shown in FIG. 14, on both sides of the jaw frame 24, pipe holders 27, 27 are mounted by bolts 26, and the half cylindrical clamping jaw 25 is supported freely rotatably with respect to the jaw frame 24 by fitting arc-shaped jaw plate portions 25c, 25c provided at the periphery on both ends of the half cylindrical clamping jaw 25 as described above into the arc-shaped grooves 27a at the inside of the pipe holders 27, 27.

Figure 15:
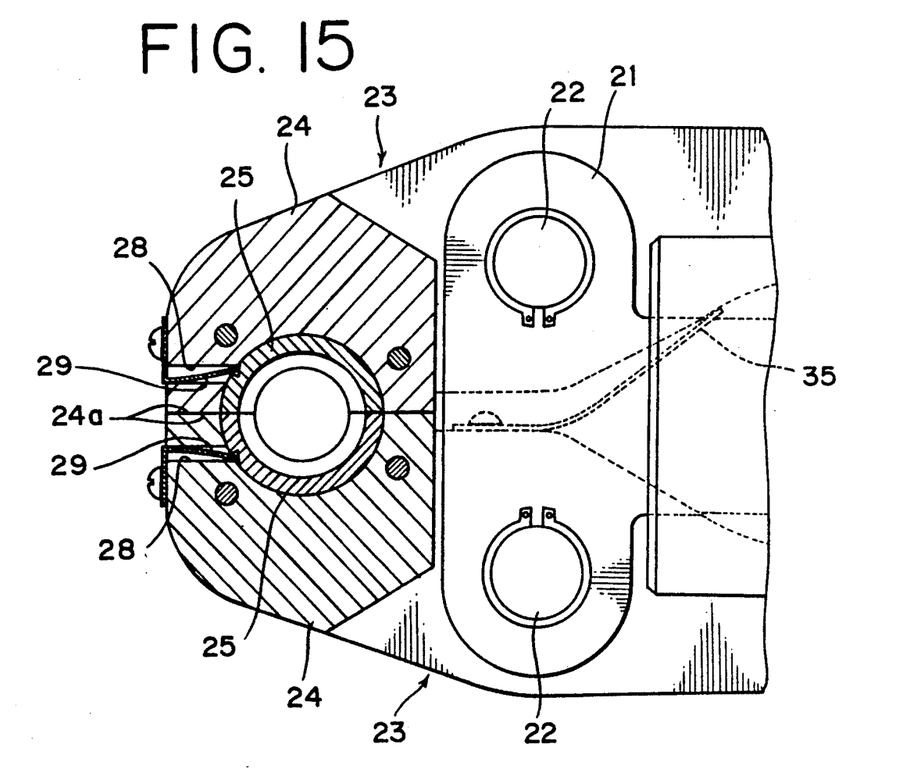
FIG. 15 is a side view partially cut away showing an enlargement of the pertinent portion of the joining tool shown in FIG. 13.

At the tip end faces of the respective jaw frame 24, 24, flat square holes 28 are provided, and into each hole 28 is inserted plate spring 29. By stopping the tip ends of the respective plate springs 29, 29 as engaged on the engaging cuttings 30, 30 provided on the tip end sides of the clamping jaws 25, 25, the end faces at the tip end sides of the clamping jaws 25, 25 are slightly protruded from the biting faces 24a, 24a of said jaw frames 24, 24.

The numeral 31 is a grip lever with two crotch portions 32 formed at the tip end, having the connecting plates 21, 21 as described above mounted at the tip end with an axial pin 33. Actuating levers 23a, 23a which are formed at the base end sides of the clamping members 23, 23 are interposed between said two crotch portions 32 and have guide faces 23b, 23b with curved shapes on the base ends thereof. Said grip lever 31 is provided with a pushing rod 34 having a curved surface at the tip end which is pushed by a hydraulic cylinder (not shown) between the above actuting levers 23a, 23a having guide faces with curved shape, pushes to open said actuating levers 23a, 23a and forces the jaw frames 24, 24 of both clamping members 23 and 23 to engage with each other. The numeral 35 is a plate spring for permitting both clamping members 23, 23 to hold the closed posture during application of no load.

Figure 16:
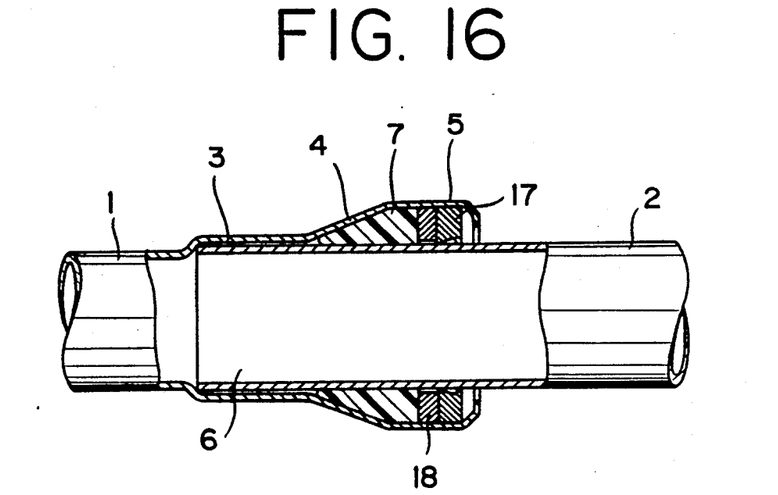
FIG. 16 is a sectional view showing the piping materials before joining.

The method of joining piping materials by use of the above joining tool is described below. As shown in FIG. 16, with the annular gasket 7 having a wedge-shaped cross-section and the C ring 17 being inserted into the tapered portion 4 formed at the end portion of the piping material 1 and the maximum diameter portion 5 continuous thereto, the end portion 6 of the piping material 2 is inserted.

Figure 17:
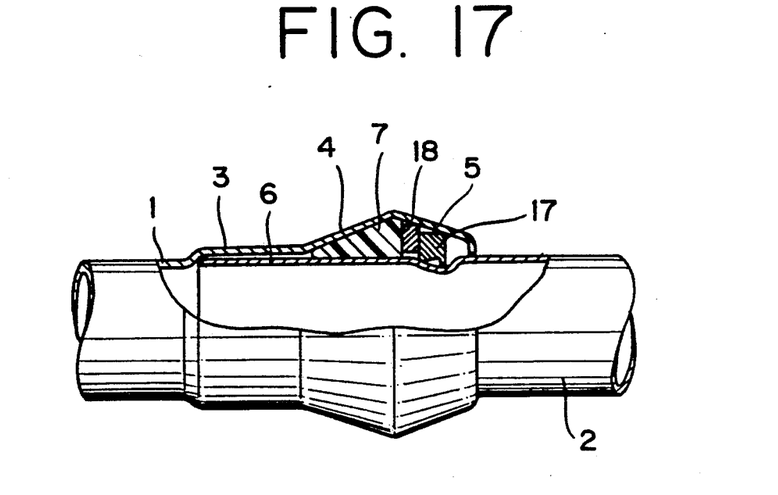
FIG. 17 is a front view partially cut away showing the piping materials joined.

Subsequently, the jaw frames 24, 24 of both clamping members 23, 23 are opened by expansion until the maximum diameter portion 5 of the piping material 1 can be inserted, thereby permitting one tapered planes of clamping action 25a of the half cylindrical clamping jaws 25, 25 fitted in said jaw frames 24, 24 to contact the tapered portion 4 of the piping material 1. Next, the pushing rod 34 is pushed between the actuating levers 23a, 23a formed at the base ends of the clamping members 23, 23 to close the jaw frames 24, 24. Then, the maximum diameter portion 5 continuous to the tapered portion 4 of the piping material 1 is compressed in diameter in the radius direction by the other tapered plane of clamping action 25b of the clamping jaws 25, 25, thereby plastically deforming gasket 7 in tapered form simultaneously with compressing of the C ring 17 against the surface of the piping material 2, to effect joining as shown in FIG. 17.

At this time, in the present invention, the clamping jaws 25, 25 are fitted freely rotatably in the jaw frames 24, 24, and also the end faces on the tip end side of said clamping jaws 25, 25 are slightly protruded from the biting faces 24a, 24a of said jaw frames 24, 24 under elastic repulsion of the plate springs 29, 29, whereby the tip end sides of the clamping jaws 25, 25 are narrowed earlier than the biting faces 24a, 24a of the jaw frames 24, 24 during clamping of the jaw frames 24, 24 and there is no inconvenience that the joined portion is extruded to the forward side of the clamping members 23, 23 during clamping.

When clamping is further continued, clamping can be done while the tip end faces of the clamping jaws 25, 25 are rotated against the plate springs 29, 29 to the same positions of the biting faces 24a, 24a of the jaw frames 24,24 to effect uniform joining.

In this Example, as apparently seen from the above description, the clamping jaws 25, 25 are fitted freely rotatably in the jaw frames 24, 24 of a pair of clamping members 23, 23, and tip end sides of the clamping jaws 25, 25 are slightly protruding from the biting faces 24a, 24a of said jaw frames 24, 24. Here, during joining of the piping materials, since the center of the clamping movement (pins 22, 22) and the center axis of piping materials are eccentric from each other, the clamping members 23, 23 undergo clamping movement while drawing an arc-shaped locus with the pins 22, 22 for rotational axes as the centers similarly as the clamping members 10, 10 in the above respective Examples. For this reason, the clamping members 23, 23 at the end sides near the pins 22, 22 will contact piping materials earlier, whereby the piping materials are pushed forward to the tip end side of the clamping members 23, 23. As a result, it may be considered that correct joining may be sometimes obstructed and pressure resistance at the joined portion slightly lowered similarly as in the above Examples.

Whereas, since the tip ends of the clamping jaws 25, 25 are slightly protruded from the biting faces 24a, 24a of the jaw frames 24, 24, the tip end sides of the clamping jaws 25, 25 are closed preceding to the jaw frames 24, 24 and therefore joining can be correctly effected on the center axis of piping materials.

We claim:

1. A method of joining piping materials which comprises:

forming a socket at an end portion of one piping material to be joined, said socket comprising a tapered portion which is diametrically enlarged gradually toward the pipe end of said one piping, and a maximum diameter portion extending from said tapered portion with the maximum diameter thereof;

then fitting an intermediary inserting member along an internal peripheral surface of said tapered portion in the socket so as to be in intimate contact therewith and thereafter inserting an end portion of another piping material thereinto;

said step of fitting said intermediary inserting member comprising arranging an annular gasket having a wedge-shaped cross-section so as to be in intimate contact with the internal peripheral surface of the tapered portion; and arranging a C ring in close contact with the internal peripheral surface of said maximum diameter portion of said socket of said one piping material and in close contact with a pipe end side face of said annular gasket, said C ring having a sharp internal rim or edge at a side thereof nearest said annular gasket and a sharp external edge at the pipe end side thereof; and applying pressure in the radial direction at least to an external peripheral portion of said maximum diameter portion of said socket with two clamping members in a single step, said clamping members having a lateral cross-sectional shape extending in an axial direction of said one and said other piping material, with a center position of said clamping members being the deepest portion and having left and right side tapered, facing planes of clamping action on both sides thereof;

said step of applying pressure comprising first applying pressure to an external portion of said socket by said tapered plane of said clamping members located remote from the pipe end of said one piping, and then applying pressure to said external peripheral portion of said socket by both said left and right side tapered facing planes of said clamping members so as to simultaneously deform said external peripheral surface of said socket at said pipe end side thereof, and also at a portion spaced away from said pipe end thereof;

said step of applying pressure producing squeezing of said external peripheral portion of said socket in a diameter reducing direction to effect plastic deformation of said maximum diameter in the diameter reducing direction, and to compress said C ring to cause said sharp internal and external edges of said C ring to be pressed against an end portion of said another piping material and against said socket, respectively, to improve a pull-out resistance of said piping materials relative to each other.

2. The method of claim 1, wherein said sharp internal rim or edge at said side of said C ring nearest said annular gasket is defined at least by a first inner surface portion of said C ring which faces said another piping material and by a second surface portion of said C ring which faces said annular gasket, the angle between said first and second surface portions being an acute angle so as to define said sharp integral rim or edge.

3. The method of claim 2, wherein said first surface portion of said C ring is an inclined surface which inclines at an angle of from 5° to 15° away from an external peripheral surface portion of said another piping material.

4. The method of claim 3, wherein said angle of inclination of said first surface portion is about 10° relative to said external peripheral surface portion of said another piping material.

5. The method of claim 3, wherein said second surface portion of said C ring is substantially perpendicular to said external peripheral surface portion of said another piping material.

6. The method of claim 1, wherein said sharp internal and external edges of said C ring are defined by respective surface portions having an acute angle defined therebetween.

7. A method of joining piping materials which comprises:

forming a socket at an end portion of one piping material to be joined, said socket comprising a tapered portion which is diametrically enlarged gradually toward the pipe end of said one piping, and a maximum diameter portion extending from said tapered portion with the maximum diameter thereof;

then fitting an intermediary inserting member along an internal peripheral surface of said tapered portion in the socket so as to be in intimate contact therewith and thereafter inserting an end portion of another piping material thereinto;

said step of fitting said intermediary inserting member comprising arranging an annular gasket having a wedge-shaped cross-section so as to be in intimate contact with the internal peripheral surface of the tapered portion; arranging a back-up ring in close contact with an internal peripheral surface of a maximum diameter portion of said socket of said one piping material and in close contact with a pipe end side face of said annular gasket; and arranging a C ring in close contact with the internal peripheral surface of the maximum diameter portion of said socket of said one piping material and in close contact with a pipe end side face of said back-up ring, said C ring having a sharp internal rim or edge at a side thereof nearest said annular gasket and a sharp external edge at the pipe end side thereof, said C ring having a gap between opposing ends thereof, and said back-up ring blocking said gap to prevent said gasket from entering said gap;

applying pressure in the radial direction at least to an external peripheral portion of said maximum diameter portion of said socket with two clamping members in a single step, said clamping members having a lateral cross-sectional shape extending in an axial direction of said one and said other piping material, with a center position of said clamping members being the deepest portion and having left and right side tapered, facing planes of clamping action on both sides thereof;

said step of applying pressure comprising first applying pressure to an external portion of said socket by said tapered plane of said clamping members located remote from the pipe end of said one piping, and then applying pressure to said external peripheral portion of said socket by both said left and right side tapered facing planes of said clamping members so as to simultaneously deform said external peripheral surface of said socket at said pipe end side thereof, and also at a portion spaced away from said pipe end thereof; and said step of applying pressure producing squeezing of said external peripheral portion of said socket in a diameter reducing direction to effect plastic deformation of said maximum diameter in the diameter reducing direction, and to compress said C ring to cause said sharp internal and external edges of said C ring to be pressed against an end portion of said another piping material and against said socket, respectively, to improve a pull-out resistance of said piping materials relative to each other.

8. The method of claim 7, wherein said sharp internal rim or edge at said side of said C ring nearest said annular gasket is defined at least by a first inner surface portion of said C ring which faces said another piping material and by a second surface portion of said C ring which faces said annular gasket, the angle between said first and second surface portions being an acute angle so as to define said sharp integral rim or edge.

9. The method of claim 8, wherein said first surface portion of said C ring is an inclined surface which inclines at an angle of from 5° to 15° away from an external peripheral surface portion of said another piping material.

10. The method of claim 9, wherein said angle of inclination of said first surface portion is about 10° relative to said external peripheral surface portion of said another piping material.

11. The method of claim 9, wherein said second surface portion of said C ring is substantially perpendicular to said external peripheral surface portion of said another piping material.

12. The method of claim 7, wherein said sharp internal and external edges of said C ring are defined by respective surface portions having an acute angle defined therebetween.

* * * * *